United States Patent
Luo et al.

(10) Patent No.: US 6,826,316 B2
(45) Date of Patent: Nov. 30, 2004

(54) SYSTEM AND METHOD FOR DETERMINING IMAGE SIMILARITY

(75) Inventors: Jiebo Luo, Rochester, NY (US); Wei Zhu, Cambridge, MA (US); George E. Sotak, Mendon, NY (US); Robert T. Gray, Rochester, NY (US); Rajiv Mehrotra, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 486 days.

(21) Appl. No.: 09/798,604

(22) Filed: Mar. 2, 2001

(65) Prior Publication Data

US 2002/0131641 A1 Sep. 19, 2002

Related U.S. Application Data

(60) Provisional application No. 60/263,960, filed on Jan. 24, 2001.

(51) Int. Cl.[7] .................................................. G06K 9/54
(52) U.S. Cl. ........................ 382/305; 382/190; 382/218; 358/403; 707/6
(58) Field of Search ................................ 382/173, 176, 382/203, 209, 190, 218, 220, 224, 228, 305; 358/403; 707/1–10

(56) References Cited

U.S. PATENT DOCUMENTS 5,579,471 A  11/1996  Barber et al. ................ 345/700

(List continued on next page.)

OTHER PUBLICATIONS

Srihari, et al Image background search: combining object detection techniques with content–based image retrieval (CBIR) systems, IEEE, pp. 1–5, Jun. 22, 1999.*

(List continued on next page.)

Primary Examiner—Daniel Miriam
(74) Attorney, Agent, or Firm—David M. Woods (57) ABSTRACT

A system and method for determining image similarity. The method includes the steps of automatically providing perceptually significant features of main subject or background of a first image; automatically providing perceptually significant features of main subject or background of a second image; automatically comparing the perceptually significant features of the main subject or the background of the first image to the main subject or the background of the second image; and providing an output in response thereto. In the illustrative implementation, the features are provided by a number of belief levels, where the number of belief levels are preferably greater than two. The perceptually significant features include color, texture and/or shape. In the preferred embodiment, the main subject is indicated by a continuously valued belief map. The belief values of the main subject are determined by segmenting the image into regions of homogenous color and texture, computing at least one structure feature and at least one semantic feature for each region, and computing a belief value for all the pixels in the region using a Bayes net to combine the features. In an illustrative application, the inventive method is implemented in an image retrieval system. In this implementation, the inventive method automatically stores perceptually significant features of the main subject or background of a plurality of first images in a database to facilitate retrieval of a target image in response to an input or query image. Features corresponding to each of the plurality of stored images are automatically sequentially compared to similar features of the query image. Consequently, the present invention provides an automatic system and method for controlling the feature extraction, representation, and feature-based similarity retrieval strategies of a content-based image archival and retrieval system based on an analysis of main subject and background derived from a continuously valued main subject belief map.

27 Claims, 6 Drawing Sheets

U.S. PATENT DOCUMENTS

| | | | | |
|---|---|---|---|---|
| 5,644,765 A | * | 7/1997 | Shimura et al. | 707/104.1 |
| 5,684,999 A | * | 11/1997 | Okamoto | 704/9 |
| 5,802,361 A | * | 9/1998 | Wang et al. | 382/217 |
| 5,835,667 A | * | 11/1998 | Wactlar et al. | 386/96 |
| 5,852,823 A | | 12/1998 | De Bonet | 707/6 |
| 5,930,783 A | * | 7/1999 | Li et al. | 707/1 |
| 6,038,365 A | | 3/2000 | Yamagami | 386/46 |
| 6,400,890 B1 | * | 6/2002 | Nagasaka et al. | 386/69 |
| 6,594,383 B1 | * | 7/2003 | Syeda-Mahmood | 382/162 |
| 6,606,623 B1 | * | 8/2003 | Hsieh et al. | 707/5 |
| 6,611,834 B1 | * | 8/2003 | Aggarwal et al. | 707/10 |

OTHER PUBLICATIONS

Rimey "Control of Selective Perception using Bayes Nets and Decision Theory", The University of Rochester, Computer Scienc Department, pp. 1–150, 1993.*

"Color Indexing", published in Intl. Journal, of Computer Vision, by M. J. Swain and D. H. Ballard vol. 7, No. 1, 1991, pp. 11–32.

"Comparing Images Using Color Coherence Vectors," published by G. Pass, et al., in Proceedings ACM Multimedia Conf., (1996).

* cited by examiner

SYSTEM AND METHOD FOR DETERMINING IMAGE SIMILARITY

CROSS REFERENCE TO RELATED APPLICATION

Reference is made to and priority claimed from U.S. Provisional Application Serial No. 60/263,960, filed 24 Jan. 2001, entitled "Image Similarity Based on Separating Foreground Subject from Background, Method and Apparatus".

FIELD OF THE INVENTION

The present invention relates to systems and methods for processing images. More specifically, the present invention relates to systems and methods for effecting automatic image retrieval.

BACKGROUND OF THE INVENTION

1. Description of the Related Art

Image-based document retrieval is required for a variety of consumer, commercial and government applications. Originally, images were retrieved manually. However, as image databases became larger, automated image retrieval systems were developed to accelerate the search and retrieval process.

One conventional automated approach involves the association of certain keywords with each image in a database. Images are then retrieved by a keyword search. However, this system suffers from the time intensive process of keyword input for large databases. In addition, the approach is highly dependent on the somewhat subjective manual assignment of keywords for each image and for the search itself. Finally, there is a limit with respect to the extent to which an image can be described adequately to allow for effective searching.

Another approach is that of automatic CBIR (content-based image retrieval). This system involves an analysis of each stored image with respect to its content (in terms of color, texture, shape, etc.). For example, the color content is stored in a histogram. In the search and retrieval process, the histogram from a query image is compared to the stored histogram data to find a best match. However, this system does not take into account spatial distribution of the color data.

The most often used approach to searching a database to select/retrieve images that are similar to a query is to compare the query image with the images in the database using their feature-based representation by means of distance functions. (See U.S. Pat. No. 5,579,471, entitled "Image Query System and Method," issued Nov. 26, 1996 to R. J. Barber et al.; U.S. Pat. No. 5,852,823, entitled "Automatic Image Classification and Retrieval System From Database Using Query-By-Example Paradigm," issued Dec. 22, 1998 to J. S. De Bonet; "Color Indexing", published in *Intl. Journal, of Computer Vision,* by M. J. Swain and D. H. Ballard, Vol. 7, No. 1, 1991, pp. 11–32; and "Comparing Images Using Color Coherence Vectors," published by G. Pass, et al., in *Proceedings ACM Multimedia Conf.,* (1996).

These techniques represent an image in terms of its depictive features, such as color or texture. Given a query image Q, its feature-based representation is compared against the representation of every image I in the database to compute the similarity of Q and I. The images in the database are then ranked in decreasing order of their similarity with respect to the query image to form the response to the query. A key shortcoming of these techniques is that no distinction is made between perceptually significant and insignificant image features in the image representation and matching schemes.

In general, a human observer determines the content-based similarity of two images primarily on the basis of the perceptually significant contents of the image and not the finer details. By mimicking this behavior, a similarity retrieval system might produce results that are in more agreement with human interpretation of similarity. However, this fact has not been exploited by any of the above mentioned techniques.

In a copending U.S. Patent Application entitled "Perceptually Significant Feature-based Image Archival and Retrieval," U.S. Ser. No. filed 14 Apr. 1999 by Wei Zhu and Rajiv Mehrotra, the teachings of which are incorporated herein by reference, Zhu et al. attempt to overcome the above-mentioned shortcoming by representing an image in terms of its perceptually significant features. Thus, similarity of two images becomes a function of the similarity of their perceptually significant features.

However, in this approach, image features are extracted from the properties of the entire image. There is no flexibility in computing image features or comparing image similarities based on main subject or background regions. As a result, more targeted searches, such as finding images with similar main subjects but dissimilar backgrounds as the query, cannot be performed.

Recently, U.S. Pat. No. 6,038,365, entitled "Image Retrieval-Oriented Processing Apparatus Which Generates and Displays Search Image Data That Is Used As Index," was issued to T. Yamagami on Mar. 14, 2000. An image processing apparatus according to this invention includes a designating unit for designating an image area to be used as a retrieval image from a recorded image recorded in a recording medium, a storing unit for storing image area data representing the image area designated by the designating unit in connection with the corresponding recorded image, and a displaying unit for displaying, as the retrieval image, an image of the image area on the basis of the corresponding image area data stored in the storing unit.

Further, an image processing apparatus according to Yamagami's invention includes a designating unit for designating an image area from an original image constituting a screen as a retrieval image, a storing unit for storing the retrieval image designated by the designating unit in connection with the corresponding original image, a displaying unit for displaying the retrieval image designated by the designating unit, an instructing unit for instructing the retrieval image displayed by the displaying unit, and a display control unit for displaying, on the displaying unit, the original image corresponding to the retrieval image instructed by the instructing unit.

Hence, Yamagami appears to disclose use of a selected area of an image for image retrieval. However, the selection is done manually using a designating unit. Further, the use of the selected area is motivated by an image reduction problem that makes characters too small to read. Since image data can generally be recognized only when a human being looks at them, when image data are reproduced, a list of a plurality of reduced images may generally be displayed so that the user can check the contents of image files, using the reduced images themselves as the retrieval images. However, in retrieval display of reduced images, since an entire image is simply reduced to, for example, one eighth in both its longitudinal and lateral dimensions, the reduced image may be too small to be recognized easily, making the use of that reduced image as a retrieval image impossible.

Consequently, Yamagami does not teach an automatic, general-purpose image retrieval apparatus. Nor is Yamagami's invention built upon an automatic scene-content analysis scheme. Accordingly, a need remains in the art for a more accurate system or method for automatically retrieving images from a database.

SUMMARY OF THE INVENTION

The need in the art is addressed by the system and method for determining image similarity of the present invention. The inventive method includes the steps of automatically providing perceptually significant features of main subject or background of a first image; automatically providing perceptually significant features of main subject or background of a second image; automatically comparing the perceptually significant features of the main subject or the background of the first image to the main subject or the background of the second image; and providing an output in response thereto.

In the illustrative implementation, the features are provided by a number of belief levels, where the number of belief levels are preferably greater than two. In the illustrative embodiment, the step of automatically providing perceptually significant features of the main subject or background of the first image includes the steps of automatically identifying main subject or background of the first image and the step of identifying perceptually significant features of the main subject or the background of the first image. Further, the step of automatically providing perceptually significant features of the main subject or background of the second image includes the steps of automatically identifying main subject or background of the second image and the step of identifying perceptually significant features of the main subject or the background of the second image.

The perceptually significant features may include color, texture and/or shape. In the preferred embodiment, the main subject is indicated by a continuously valued belief map. The belief values of the main subject are determined by segmenting the image into regions of homogenous color and texture, computing at least one structure feature and at least one semantic feature for each region, and computing a belief value for all the pixels in the region using a Bayes net to combine the features.

In an illustrative application, the inventive method is implemented in an image retrieval system. In this implementation, the inventive method automatically stores perceptually significant features of the main subject or background of a plurality of first images in a database to facilitate retrieval of a target image in response to an input or query image. Features corresponding to each of the plurality of stored images are automatically sequentially compared to similar features of the query image. Consequently, the present invention provides an automatic system and method for controlling the feature extraction, representation, and feature-based similarity retrieval strategies of a content-based image archival and retrieval system based on an analysis of main subject and background derived from a continuously valued main subject belief map.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As discussed more filly below, the present invention automatically determines image similarity according to an analysis of the main subject in the scene. A system for detecting main subjects (i.e., main subject detection or "MSD") in a consumer-type photographic image from the perspective of a third-party observer is described in copending U.S. patent application Ser. No. 09/223,860, filed Dec. 31, 1998, by J. Luo et al. and entitled METHOD FOR AUTOMATIC DETERMINATION OF MAIN SUBJECTS IN PHOTOGRAPHIC IMAGES (Atty. Docket No. 78783) the teachings of which are incorporated herein by reference.

Main subject detection provides a measure of saliency or relative importance for different regions that are associated with different subjects in an image. Main subject detection enables a discriminative treatment of the scene content for a number of applications related to consumer photographic images, including automatic content-based image retrieval.

Conventional wisdom in the field of computer vision, which reflects how a human observer would perform such tasks as main subject detection and cropping, calls for a problem-solving path via object recognition and scene content determination according to the semantic meaning of recognized objects. However, generic object recognition remains a largely unsolved problem despite decades of effort from academia and industry.

The MSD system is built upon mostly low-level vision features with semantic information integrated whenever available. This MSD system has a number of components, including region segmentation, feature extraction, and probabilistic reasoning. In particular, a large number of features are extracted for each segmented region in the image to represent a wide variety of visual saliency properties, which are then input into a tunable, extensible probability network to generate a belief map containing a continuum of values.

Using MSD, regions that belong to the main subject are generally differentiated from the background clutter in the image. Thus, selective retrieval according to similar main subjects or similar background becomes possible. It even becomes possible to perform selective retrieval according to dissimilar main subjects or dissimilar background.

Automatic subject-based image indexing is a nontrivial operation that would be considered impossible for unconstrained images, which do not necessarily contain uniform background, without a certain amount of scene understanding and scene-content differentiation. In the absence of automatic subject/background segmentation, conventional systems either have to rely on a manually created mask to outline where the main subject is or do not have any capability of subject-based image retrieval. The manual procedure is laborious and therefore not feasible for commercial mass processing for consumers.

Figure 1:
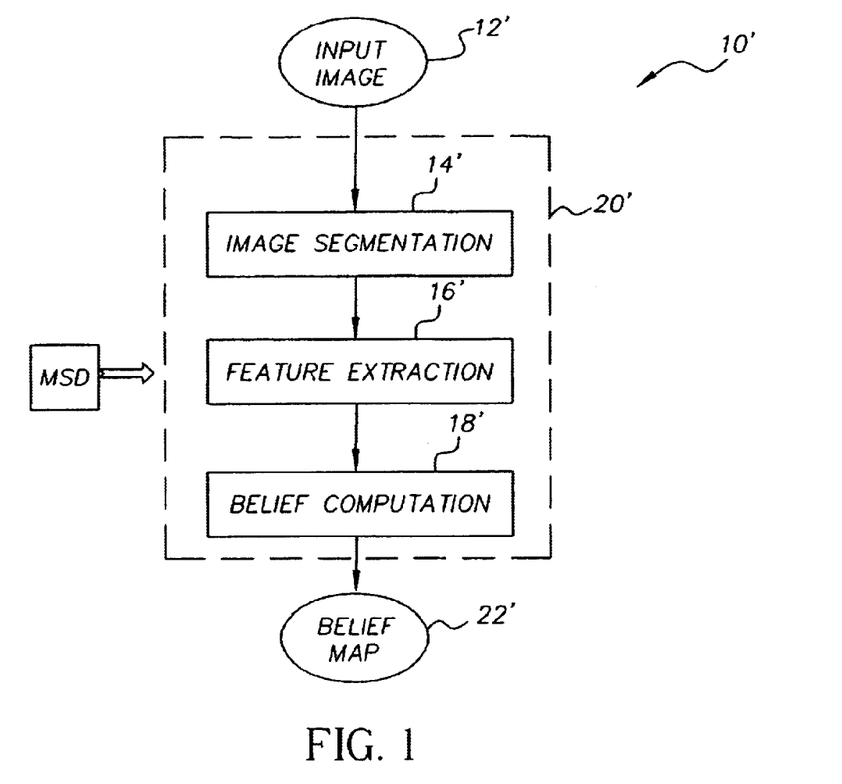
FIG. 1 is a block diagram of an illustrative embodiment of an automatic main subject detection system.

FIG. 1 is a block diagram illustrative of an embodiment of an automatic main subject detection system implemented in accordance with the teachings of the above-referenced application filed by Luo et al. In accordance with the system 10' of Luo et al., an input image 12' is first segmented into a few regions of homogeneous properties (e.g., color and texture) in an image segmentation process step 14'. Next, the regions are evaluated for their saliency in terms of two independent but complementary types—structural features and semantic features in a feature extraction process step 16'. For example, recognition of human skin or faces is semantic while determination of what stands out from the background clutter is categorized as structural. For structural features, a set of low-level vision features and a set of geometric features are extracted. For semantic features, key subject matters frequently seen in photographic pictures are detected. In a belief computation process step 18', evidence of both types of features are integrated using a Bayes net-based reasoning engine to yield the final belief map 22' of the main subject. For reference on Bayes nets, see J. Pearl, *Probabilistic Reasoning in Intelligent Systems,* Morgan Kaufmann, San Francisco, Calif., 1988.

One structural feature is centrality. In terms of location, the main subject tends to be located near the center instead of the periphery of the image, though not necessarily right in the center of the image. In fact, professional photographers tend to position the main subject at the horizontal gold-partition positions ("rule of a third").

It is recognized that the centroid of the region alone may not be sufficient to indicate the location of a region without any indication of its size and shape. A centrality measure is defined by computing the integral of a probability density function (PDF) over the area of a given region. The PDF is derived from the ground truth data, in which the main subject regions are manually outlined and marked by a value of 1 and the background regions are marked by a value of 0, by summing up the ground truth maps over the entire training set. In essence, the PDF represents the distribution of main subjects in terms of location.

In accordance with the present teachings, a centrality measure is devised such that every pixel of a given region, not just the centroid, contributes to the centrality measure of the region to a varying degree depending on its location. The centrality measure is defined as:

$$\text{centrality} = \frac{1}{N_R} \sum_{(x,y) \in R} PDF_{\text{MSD\_Location}}(x, y) \quad [1]$$

where (x, y) denotes a pixel in the region R, $N_R$ is the number of pixels in region R. If the orientation is unknown, the PDF is symmetric about the center of the image in both vertical and horizontal directions, which results in an orientation-independent centrality measure. If the orientation is known, the PDF is symmetric about the center of the image in the horizontal direction but not in the vertical direction, which results in an orientation-dependent centrality measure.

Another structure feature is borderness. Many background regions tend to contact one or more of the image borders. Therefore, a region that has significant amount of its contour on the image borders tends to belong to the background. In accordance with the present teachings, two measures are used to characterize the borderness of a region, the percentage of its perimeter along the image border(s) and the number of image borders that a region intersects.

When orientation is unknown, one borderness feature places each region in one of six categories determined by the number and configuration of image borders the region is "in contact" with. A region is "in contact" with a border when at least one pixel in the region falls within a fixed distance of the border of the image. Distance is expressed as a fraction of the shorter dimension of the image. The six categories for bordernes_1 are {none, one border, two touching borders, two facing borders, three, four}.

Knowing the image orientation allows us to redefine the borderness feature to account for the fact that regions in contact with the top border are much more likely to be background than regions in contact with the bottom border. This results in 12 categories for borderness_1 determined by the number and configuration of image borders the region is "in contact" with, using the definition of "in contact with" from above. The four borders of the image are labeled as "Top", "Bottom", "Left", and "Right" according to their position when the image is oriented with objects in the scene standing upright.

A second borderness features borderness_2 is defined to indicate what fraction of the region perimeter is on the image border. Because such a fraction cannot exceed 0.5, we use the following definition to normalize the feature value to [0, 1].

$$\text{borderness\_1} = 2 \times \frac{\text{number\_of\_region\_perimeter\_pixels\_on\_image\_border}}{\text{number\_of\_region\_perimeter\_pixels}} \quad [2]$$

Yet another structural feature may be depth. In general, depth of all the objects in the scene is not available. However, if available, for example through a range finder, such a feature is valuable for differentiating the main subject from the background because the main subject tends to be in the foreground and closer to the observer. Note that, however, objects in the foreground may not necessarily be the main subject.

One semantic feature is skin. According a study of a photographic image database of over 2000 images, over 70% of the photographic images have people and about the same number of images have sizable faces in them. Indeed, people are the single most important subject in photographs.

The current skin detection algorithm utilizes color image segmentation and a pre-determined skin distribution in a specific chrominance space, P(skin|chrominance). It is known that the largest variation between different races is along the luminance direction, and the impact of illumination sources is also primarily in the luminance direction. The skin region classification is based on maximum probability according to the average color of a segmented region. The probabilities are mapped to a belief output via a sigmoid belief function.

The task of main subject detection, therefore, is to determine the likelihood of a given region in the image being the main subject based on the posterior probability of P(MSD|feature). Note that there is one Bayes net active for each region in the image. In other words, the reasoning is performed on a per region basis (instead of per image).

The output of MSD operation, is a list of segmented regions ranked in descending order of their likelihood (or belief) as potential main subjects for a generic or specific application. This list can be readily converted into a map in which the brightness of a region is proportional to the main subject belief of the region. Therefore, this map is called a main subject "belief" map. This "belief" map is more than a binary map that only indicates location of the determined main subject. The associated likelihood is also attached to each region so that the regions with large values correspond to regions with high confidence or belief of being part of the main subject.

To some extent, this belief map reflects the inherent uncertainty for humans to perform such a task as MSD because different observers may disagree on certain subject matters while agreeing on other subject matters in terms of main subjects. However, a binary decision, when desired, can be readily obtained by using an appropriate threshold on the belief map. Moreover, the belief information may be very useful for downstream applications. For example, different weighting factors can be assigned to different regions (subject matters) in determining the amount of emphasis on subject or background.

For determination of subject and background, the present invention can also use the main subject belief map instead of a binarized version of the map to avoid making a suboptimal decision about main subject and background that is visually incorrect. A binary decision on what to include and what not to include, once made, leaves little room for error. For example, even if portions of the main subject are not assigned the highest belief, with a gradual (as opposed to binary) emphasizing process, it is likely they would retain some importance. In other words, if an undesirable binary decision on what to include/exclude is made, there is no recourse to correct the mistake. Consequently, the accuracy of the retrieval becomes sensitive to the robustness of the automatic MSD method and the threshold used to obtain the binary decision. With a continuous-valued main subject belief map, every region or object is associated with a likelihood of being emphasized or de-emphasized. Moreover, secondary main subjects are indicated by intermediate belief values in the main subject belief map, and can be somewhat emphasized according to a descending order of belief values while the main subject of highest belief values are emphasized the most.

After the main subject belief map is created, a multi-level belief map can be derived from the continuous-valued main subject belief map by multi-level thresholding or clustering. This process creates a step-valued belief map, which characterizes a gradual but discrete belief transition from definite main subject, to most likely main subject, all the way down to definite background. Those skilled in the art may note that within the scope of this invention, the number of discrete belief levels (N) can be any integer value between 2 (binary decision) and the original resolution of the continuous belief map. After the multi-level belief map is created, in order to allow image similarity computation based on main subject regions or background regions of the image, or a combination thereof, image features are computed for each of the N discrete levels of the belief map. Together with the original image, each level of the belief map acts as a mask that selects only those pixels that belong to that particular belief level from the original image, and perceptually significant features for the pixels that belong to that particular level are computed. Henceforth, an image masked for a particular belief level will be referred to as a "belief level image." According to the present invention, the preferred features for the representation of each belief level of an image are color and texture. Those skilled in the art should note that additional features such as shape can be used without departing from the scope of this invention.

In accordance with the present teachings, the inventive method includes the steps of automatically providing perceptually significant features of main subject or background of a first image; automatically providing perceptually significant features of main subject or background of a second image; automatically comparing the perceptually significant features of the main subject or the background of the first image to the main subject or the background of the second image; and providing an output in response thereto.

In the illustrative implementation, the features are provided by a number of belief levels, where the number of belief levels are preferably greater than two. In the illustrative embodiment, the step of automatically providing perceptually significant features of the main subject or background of the first image includes the steps of automatically identifying main subject or background of the first image and the step of identifying perceptually significant features of the main subject or the background of the first image. Further, the step of automatically providing perceptually significant features of the main subject or background of the second image includes the steps of automatically identifying main subject or background of the second image and the step of identifying perceptually significant features of the main subject or the background of the second image.

The perceptually significant features may include color, texture and/or shape. In the preferred embodiment, the main subject is indicated by a continuously valued belief map. The belief values of the main subject are determined by segmenting the image into regions of homogenous color and texture, computing at least one structure feature and at least one semantic feature for each region, and computing a belief value for all the pixels in the region using a Bayes net to combine the features.

In an illustrative application, the inventive method is implemented in an image retrieval system. In this implementation, the inventive method automatically stores perceptually significant features of the main subject or background of a plurality of first images in a database to facilitate retrieval of a target image in response to an input or query image. The input images may be provided by a storage medium, an image scanner or other suitable method. Features corresponding to each of the plurality of stored images are automatically sequentially compared to similar features of the query image. The inventive method may be implemented in a personal computer or other suitable system. As discussed more fully below, the present invention provides an automatic system and method for controlling the feature extraction, representation, and feature-based similarity retrieval strategies of a content-based image archival and retrieval system based on an analysis of main subject and background derived from a continuously valued main subject belief map.

Figure 2:
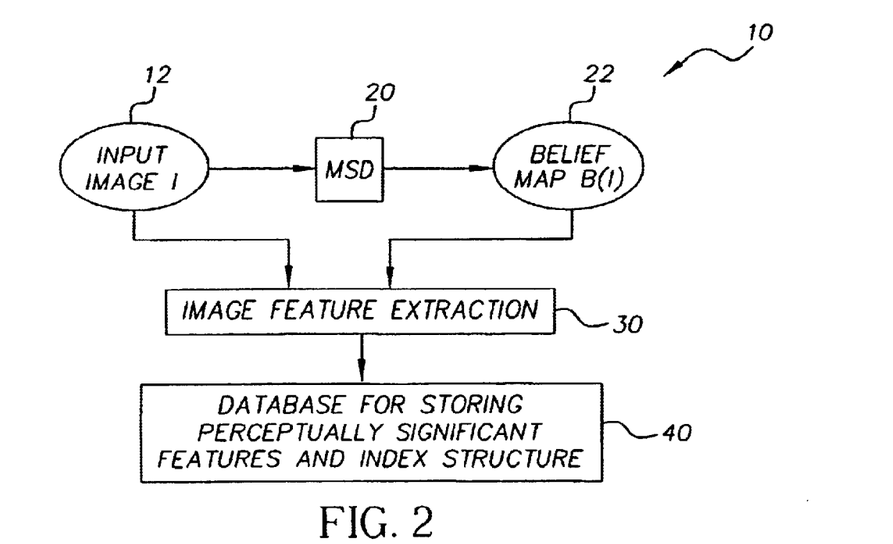
FIG. 2 is a simplified block diagram of a general scheme for image feature extraction in accordance with the teachings of the present invention.

FIG. 2 is a simplified block diagram of a general scheme for image feature extraction utilizing a component of main subject detection as a means for separating subject and background to create a database of perceptually significant features in accordance with the teachings of the present invention. The system 10 includes an MSD unit 20 which receives a series of input images 12 and a respective belief map 22 for same. An image feature extraction unit 30 receives each input image and each associated belief level image and outputs perceptually significant features with respect thereto to a database 40.

The preferred approach to identifying perceptually significant colors of a belief level image is based on the assumption that significantly sized coherently colored regions are perceptually significant. Therefore, colors of significantly sized coherently colored regions are considered to be perceptually significant colors.

The preferred embodiment offers two different methods for the identification of perceptually significant colors of any belief level image. Those skilled in the art should note that alternative color features can be used without departing from the scope of this invention. One of these methods is selected for setting up the image database 40. The key steps of the first approach are shown in FIG. 3.

Figure 3:
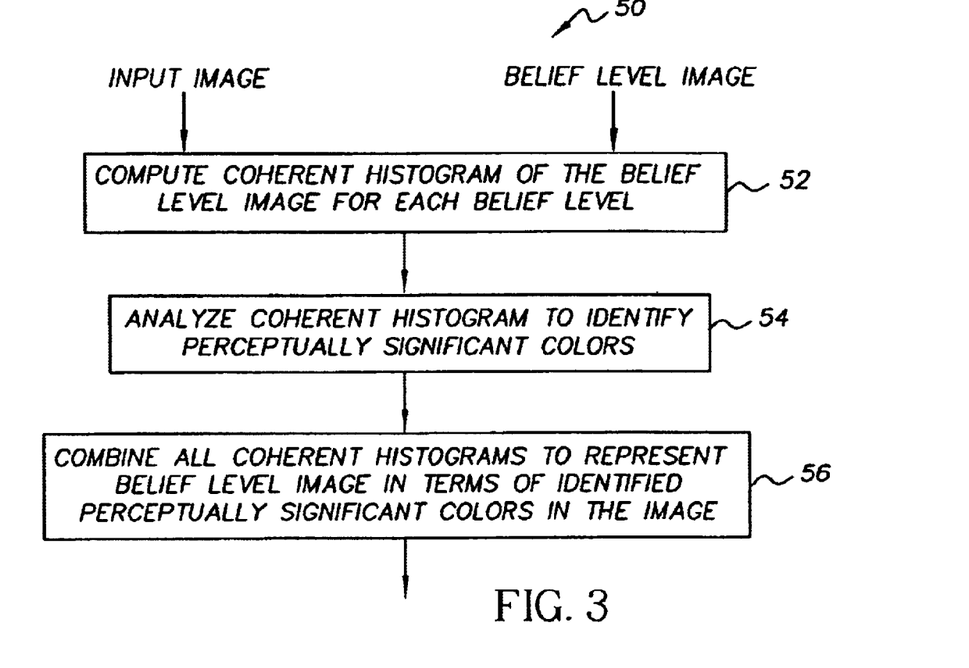
FIG. 3 is a flow diagram showing an illustrative embodiment of a method for identifying perceptually significant colors of a belief level image in accordance with the teachings of the present invention.

FIG. 3 is a flow diagram showing an illustrative embodiment of a method 50 for identifying perceptually significant colors of a belief level image in accordance with the teachings of the present invention. As shown in FIG. 3, for every belief level image, its coherent color histogram is first computed at step 52. A coherent color histogram of an image is a function of the form H(c)=number of pixels of color c that belong to coherently colored regions. Here c is a valid color in the dynamic range of the pixels within the current belief level. A pixel is considered to belong to a coherently colored region if its color is equal or similar to the colors of a pre-specified minimum number of neighboring pixels. The present implementation has two definitions of coherency: (i) a minimum of 2 matching or similar neighbors, and (ii) all neighbors are matching/similar. The same coherency definition must be used for analyzing all images in both the image archival and retrieval phases. Two colors are considered equal if all the corresponding channel values are equal. Two colors c1 and c2 are considered similar if their difference diff(c1, c2) is less than a user specified threshold $C_T$. The preferred value of $C_T$ is in the range of 15% to 20% of the maximum possible value of diff(c1, c2). Several different color difference computation methods are possible. In the present invention, one of the following three methods for comparing two L-channel colors is selected at the system initialization time:

(i) Color $c_x$ and $c_y$ are considered similar if $|c_x^i - c_y^i| < C_T^i$, where $c_k^i$ denotes the value of the i-th channel of color $c_k$ and $C_T^i$ denotes the pre-specified threshold value for the difference of the i-th channel values.

(ii) Color $c_x$ and $c_y$ are considered similar if $\Sigma_{i=1, L} w_i \cdot (c_x^i - c_y^i)^2 < C_T$, where $c_k^i$ denotes the value of the i-th channel of color $c_k$, $w_i$ is the weight of the i-th channel, and $C_T$ denotes the pre-specified threshold value.

(iii) Color $c_x$ and $c_y$ are considered similar if $\Sigma_{i=1, L} w_i \cdot |(c_x^i - c_y^i)| < C_T$, where $c_k^i$ denotes the value of the i-th channel of color $c_k$, $w_i$ is the weight of the i-th channel, and $C_T$ denotes the pre-specified threshold value.

Then, at step 54 in FIG. 3, the coherent color histogram is analyzed to identify the perceptually significant colors. A color k is considered to be a perceptually significant color if H(k)>T. Here T is a threshold. In the present implementation T=0.5% of total numbers of pixels in the current belief level image.

The next step 56 is to represent the properties of the current belief level image in term of its perceptually significant colors. Specifically, the color features of belief level image I is represented by a vector of the form $I_C = \{N, Z, <C_i, S_i>\}$, $0 < i < N-1$. Here, N is the number of perceptually significant colors in the current belief level image I, $Z = Y \Sigma S_i$, $C_i$ is the color value of the $i^{th}$ perceptually significant color of belief level image I, and $S_i$ is the ratio of $H(C_i)$ and the total number of pixel in belief level image I.

Figure 4:
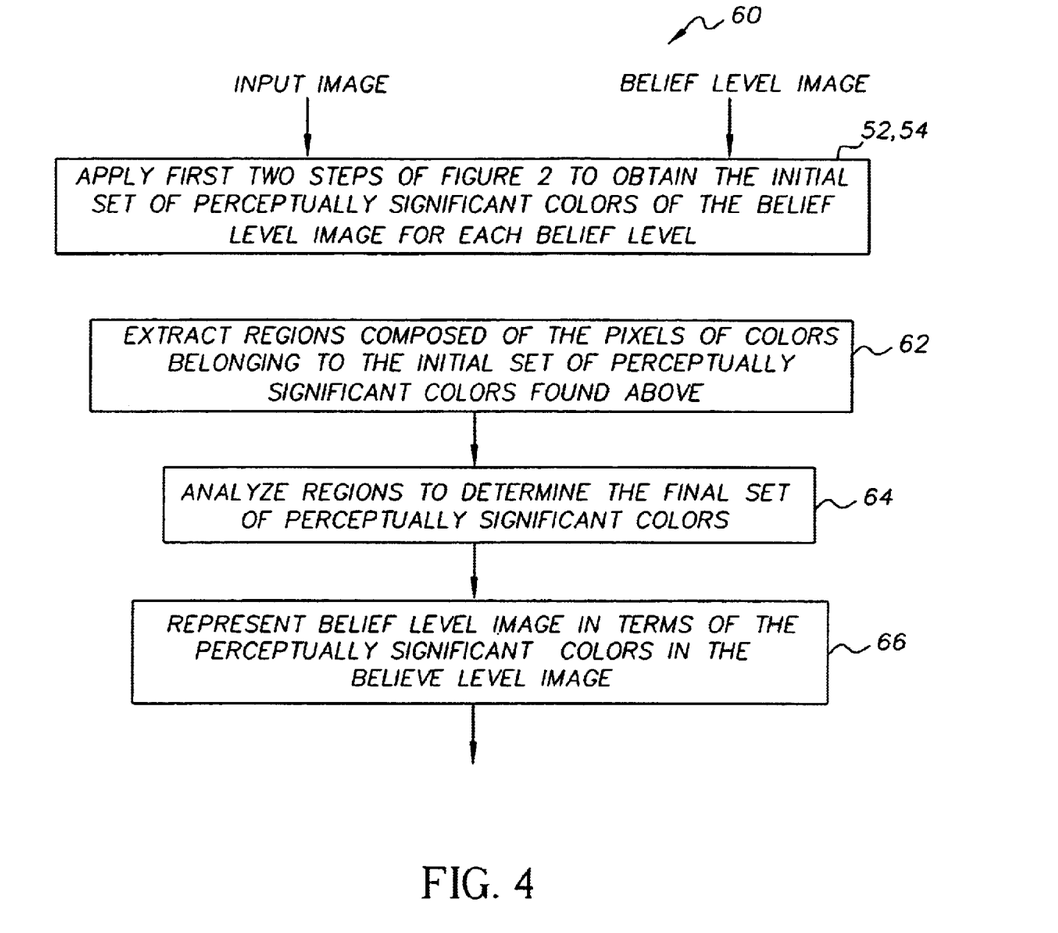
FIG. 4 is a flow diagram showing an illustrative alternative embodiment of a method for identifying perceptually significant colors of a belief level image in accordance with the teachings of the present invention.

The key steps of the second method for identifying perceptually significant colors of an image are shown in FIG. 4.

FIG. 4 is a flow diagram showing an illustrative alternative embodiment of a method for identifying perceptually significant colors of a belief level image in accordance with the teachings of the present invention. This method 60 is an extension of the first method 50 of FIG. 3. In this case, the first two steps 52 and 54 of the first method 50 are performed to detect perceptually significant colors. The set of perceptually significant colors so obtained is considered the initial set of perceptually significant colors and it is refined to obtain the set of dominant perceptually significant colors. The refinement processed starts with the step 62 finding of connected components or regions composed solely of the pixels of colors belonging to the initial set of perceptually significant colors. This is accomplished by performing connected component analysis on the belief level image considering only the pixels of perceptually significant colors and ignoring others. Alternatively, the connected component analysis results from color segmentation performed during MSD can be used here, with the additional step of weeding out the connected regions formed by non-perceptually significant colors determined earlier. Two neighboring pixels (4 or 8-neighbors) with perceptually significant colors (i.e., colors in the initial set of the perceptually significant colors) are considered connected only if they are of matching/similar colors.

At step 64, the regions so obtained are analyzed to determine the set of dominant perceptually significant colors. A connected component of size greater than a pre-specified threshold $T_S$ is considered a dominant perceptually significant segment. In the present implementation, $T_S = 0.25\%$ of the total number of pixel in the current belief level image. Colors belonging to a dominant perceptually significant segments form the set of perceptually significant colors for image representation.

The final step 66 is again to represent the properties of the current belief level image in terms of its perceptually significant colors. Note that this final set of perceptually significant colors is a subset of the initial set of perceptually significant colors.

Those skilled in art would recognize that several variations of the above two color-based image representations are possible within the scope of the present teachings. For example, one straightforward extension is a combination of the two representations, where the representation of method 1 is extended by qualifying each perceptually significant color by a type which indicates whether or not that color belongs to a dominant perceptually significant segment.

Figure 5:
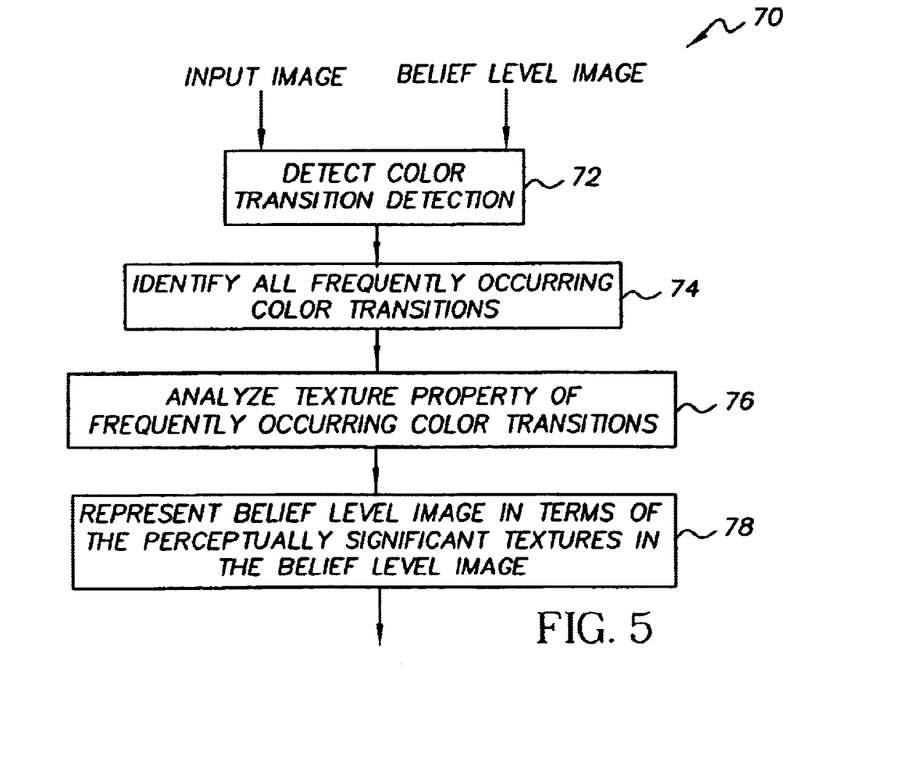
FIG. 5 is a flow diagram of an illustrative method for identifying perceptually significant textures in accordance with the teachings of the present invention.

According to the present invention, texture feature-based representation of an image is in terms of perceptually significant textures present in the image. The preferred approach to identifying perceptually significant textures of a belief level image is based on the assumption that each perceptually significant texture is composed of large numbers of repetitions of the same color transition(s). Therefore, by identifying the frequently occurring color transitions and analyzing their textural properties, perceptually significant textures can be extracted and represented. The preferred embodiment for the identification of perceptually significant textures of a belief level image is shown in FIG. 5. Those skilled in the art should note that alternative texture features can be used without departing from the scope of this invention.

FIG. 5 is a flow diagram of an illustrative method for identifying perceptually significant textures in accordance with the teachings of the present invention. The first step 72 in the process 70 is to detect all the color transitions that are present in the current belief level image. A color transition occurs between a current pixel (c) and its previous pixel (p) if a change of color value, dist(c, p), is greater than a predefined threshold th. The preferred value of th is in the range of 15% to 20% of the maximum possible value of dist(c, p). A pixel where a color transition occurs is referred to as a color-transition-pixel. In the illustrative embodiment, one of the following two methods for comparing two L-channel colors can be selected to determine the occurrence of a change of color value, hence, a color transition:

(i) The current pixel is identified to be a color-transition-pixel if:

$$|c.ch_0 - p.ch_0| \geq th.ch_0 \text{ or } |c.ch_1 - p.ch_1| \geq th.ch_1 \ldots \text{ or } |c.ch_i - p.ch_i| \geq th.ch_i, 0 \leq i \leq L \quad [3]$$

where $c.ch_i$ represents the i-th color channel value of the current pixel, $p.ch_i$ represents the i-th color channel value of the previous pixel, and $th.ch_i$ represents the predefined difference threshold for the i-th color channel.

(ii) The current pixel is identified to be a color-transition-pixel if $$\sqrt{\sum_{i=0,L} (c.ch_i - p.ch_i)^2} \geq th \quad [4]$$

where $c.ch_i$ represents the i-th color channel value of the current pixel, $p.ch_i$ represents the i-th color channel value of the previous pixel, and th represents the predefined color difference threshold.

Those skilled in art would recognize that the concept of color transition can be defined as gray-level or brightness transition in case of monochromatic images. They would also recognize that other color difference metrics could be employed for determining the existence of a color transition within the scope of this invention.

In accordance with the present invention, the belief level images are scanned horizontally and vertically to identify all color-transition-pixels using one of the above methods. Every color-transition-pixel signals a color transition and each color transition is represented by the two colors (c1, c2) corresponding to the previous and the current pixel color values that form the color transition.

The second step 74 in the process 70 of FIG. 5 is to identify all the frequently occurring color transitions. Two dimensional color transition histograms with c1 and c2 being the two dimensions are constructed to record the frequency of various color transitions found in the previous step. A global color transition histogram is constructed and populated by all the color transitions found in the image. Finding all the peaks in the color transition histogram that also exceeds a predefined minimum frequency of occurrence threshold identifies the frequently occurring color transitions. The preferred minimum frequency threshold for identifying frequently occurring color transitions for global color transition histogram is 0.25% of the total number of pixels in the current belief level image.

The third step 76 in the process 70 is texture property analysis of frequently occurring color transitions to represent perceptually significant textures. For every frequently occurring color transition, all the occurrences of this particular color transition in the current belief level image are found, and a scale and a gradient value is calculated. In the current embodiment, scale is calculated as the distance in terms of pixels, between the occurrence of color c1 and color c2. Gradient is calculated as $\tan^{-1}(g_y/g_x)$ where $g_y$ and $g_x$ are the vertical and horizontal edge information at the color transition respectively, calculated using the Sobel gradient operator. The Sobel gradient operator is well-known to those of ordinary skill in the art.

Note that other techniques for calculating scale and gradient values are possible without departing from the scope of the present invention.

The calculated scale and gradient values for each occurrence are used to construct a scale-gradient histogram. After all the occurrences have been accounted, the scale-gradient histogram is used to analyze the textural properties of the perceptually significant texture. For random textures, the scale gradient histogram is randomly distributed, while for structured textures, a significantly sharp mode in scale, gradient, or both can be detected in the scale-gradient histogram. For a color transition corresponding to a random texture, the scale-gradient histogram is used to compute the scale-gradient mean vector and the scale-gradient covariance matrix. For a color transition corresponding to a structured texture, the corresponding histogram mode is used to compute the scale-gradient mean vector and the scale-gradient covariance matrix. The properties are used to represent a perceptually significant texture.

The final step 78 is to represent the belief level image in terms of its perceptually significant textures. A belief level image I is represented by a vector of the form $I_T = \{N, Z, <C^1_i, C^2_i, P_i, M_i, V_i, S_i>\}$, $0 \leq i < N-1$. Here N is the number of dominant perceptually significant textures in belief level image I; $Z = \Sigma S_i$; $C^1_i$ and $C^2_i$ are the color value of the frequently occurring color transition corresponding to the i-th perceptually significant texture; $P_i$ is the textural type of the i-th perceptually significant texture, taking on one of the following possible values: random, scale-structured, gradient-structured, or scale-gradient-structured; $M_i$ and $V_i$ are the scale-gradient mean vector and scale-gradient covariance matrix of the i-th perceptually significant texture in the set, respectively, and $S_i$ is the total area coverage of the i-th perceptually significant texture calculated by accumulating all the scale values over all the occurrences of the frequently occurring color transition corresponding to the i-th perceptually significant texture. Those skilled in art would recognize that other textural properties, or a subset/superset of $I_T$ can be employed to represent a perceptually significant texture without departing from the scope of the present teachings.

The perceptually significant features for each of the belief level images are thus calculated, and represented in vector forms. Each image will be fully represented by N sets of color and texture feature representations, corresponding to the N belief levels, and these representations along with the images are stored in the database 40 for later query and retrieval. Those skilled in the art would recognize that other features, such as structure, composition, and shape, can also be calculated and used to represent the belief level images without exceeding the scope of this invention.

Returning to FIG. 2, after generating the perceptually significant feature-based image feature representation for each belief level, the next step is to insert the digital image and the associated representation into the corresponding database 40 and appropriate index structures. Those skilled in art would recognize that the overall database organization is dependent on the underlying database/file management system. In the present implementation, the digital images reside in the image database. The image feature representations for each of the belief level images are also stored in the database, as well as in the indexing structures. In addition to the perceptually significant feature representations, an image feature representation also contains the image identifier/locator which act as a reference to the digital image file. The image name/id acts as a locator of its representation.

Those skilled in the art would recognize that the choice of index structure for organizing a database is dependent on the desired functions to be performed by the index structure. The functionality needed in the current implementation is to facilitate selection and retrieval of images that are similar to a given query image. In order to facilitate this functionality, given a perceptually significant feature f of a given belief level image, the index structure provides the list of pointers/references to all images in the database that contain the feature f in the corresponding belief level image.

In the preferred embodiment, for color-based searches, perceptually significant color based index is created. That is, given a color value at a particular belief level, the index provides a list of images containing that color as a perceptually significant color at that particular belief level. For texture-based searches, one or both of the following two indices are created: (a) an index that associates with a color-transition at a particular belief level a list of images that contain perceptually significant textures composed of that color transition at that particular belief level, and (b) an index that associates with a <color transition, texture type> pair at a particular belief level a list of images that contain perceptually significant textures of that type composed of that color transition at that particular belief level. Those skilled in the art would recognize that other index structures could also be implemented within the scope of this invention.

Figure 6:
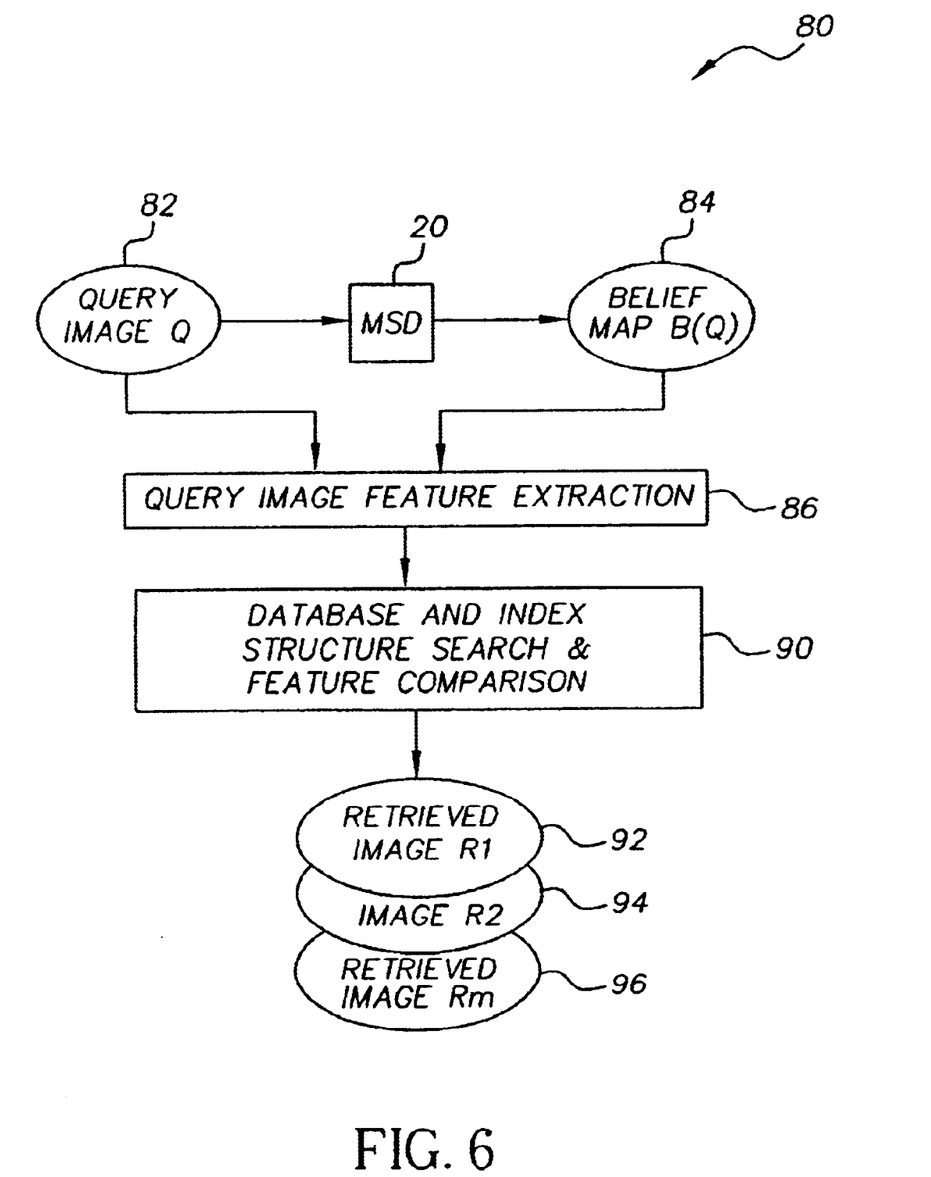
FIG. 6 and FIG. 7 are simplified block diagrams of a general scheme for image retrieval implemented in accordance with the teachings of the present invention.

In the image query and retrieval phase, the key steps of the example image-based similar image retrieval/selection process are shown in FIG. 6.

Figure 7:
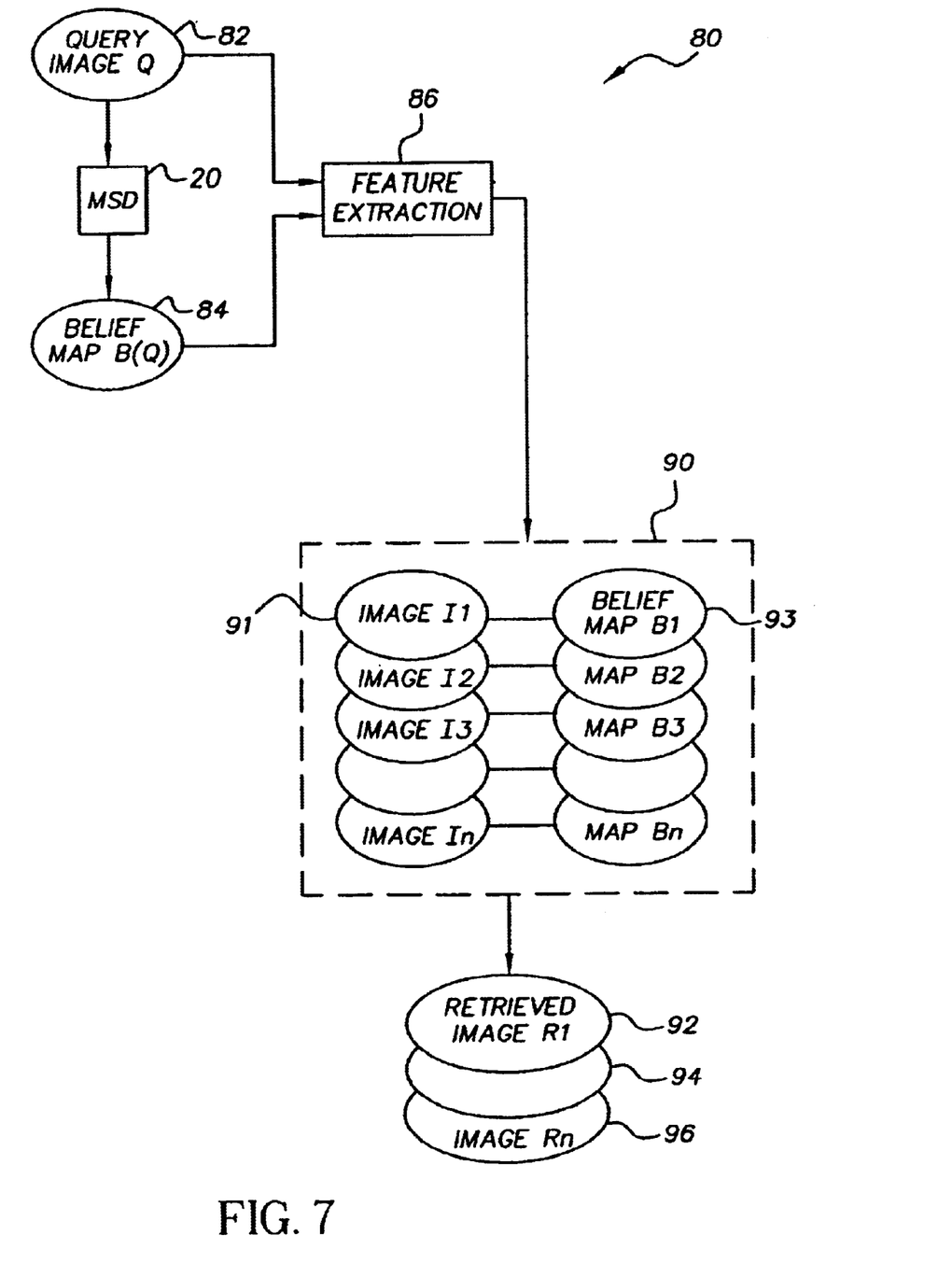

FIG. 6 and FIG. 7 are simplified block diagrams of a general scheme for image retrieval implemented in accordance with the teachings of the present invention. FIG. 7 is essentially identical to FIG. 6 with the exception of the additional detail provided with respect to the database 90. In the feature extraction unit 86, a desired representation, with respect to a given query/example image, is either computed or obtained. That is, if the query/example image is selected from the current database of images, its representation is obtained from the database. If the query/example image is a new image then its main subject belief map is first computed, its multi-level belief map is created, and feature representations as described earlier for each of the belief level images are subsequently computed. Then, the representations of the database images are compared in a search and comparison unit 90 with the representation of the query image to determine a measure of similarity. And finally, the database images are rank-ordered based on the computed similarity to the query image.

In order to determine the similarity between a query image and a database image, firstly, the color-based similarity, texture-based similarity, or a combination of the two is computed for each of the N corresponding belief level query and database images. For color-based similarity, the preferred options for a measure of similarity are:

$$(a)\ D(q, d) = \sum_{i=1}^{K} \min(S_i^q, S_i^d) \quad [5]$$

$$(b)\ D(q, d) = \mathit{diff}(\Omega^q, \Omega^d)$$

where in K is the number of matching colors of query belief level image q and database belief level image d; $S_i^q$ and $S_i^d$ are the size attribute values for the i-th matching color of belief level images q and d, respectively; diff is a normalized distance function of the type $L_x|.|$ norm for a given x; and $\Omega_q$ and $\Omega_d$ are the set of size attribute values of the corresponding perceptually significant colors of belief level images q and d. For texture-based similarity, the preferred measure of similarity between the query/example belief level image and the candidate belief level image is a function of the similarity of their matching perceptually significant textures, and also the total area coverage of their matching perceptually significant textures. Two perceptually significant textures are matching if they have matching color values C1, C2, and the same texture property value P (random or structured) in their representation. In the preferred embodiment, for each matching perceptually significant texture, the similarity is calculated from the scale-gradient mean vector M and the scale-gradient covariance matrix V using either Euclidean distance or Mahalanobis distance. Note that other distance functions may also be used within the scope of this invention. The overall image similarity score between the candidate and the query/example belief level image is determined as the sum of the similarity value of all the matching perceptually significant textures multiplied by a function (flat, linear, nonlinear) of the relative area coverage S of the texture in the belief level image. For a combination of color and texture similarity, the weighted sum of the color-based and texture-based similarities can be computed. Those skilled in the art should again note that additional features, for example, shape features, and combinations of features can be used in determining similarity without exceeding the scope of this invention.

Figure 8:
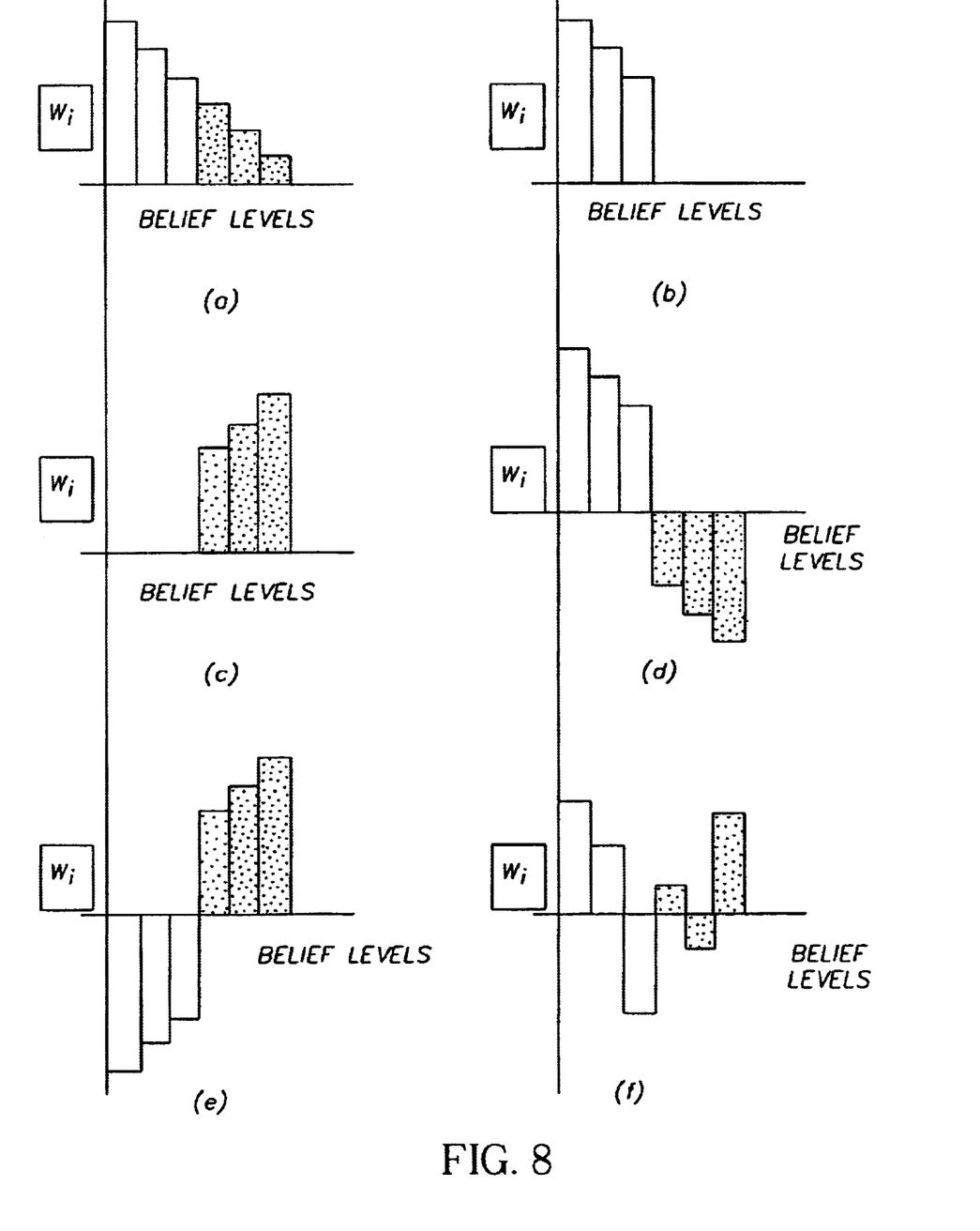
FIG. 8 is a diagram showing a series of belief level representations illustrative of numerous options for image retrieval in accordance with the teachings of the present invention.

The overall image similarity between a query image and a database image is calculated as the weighted sum of the similarity of each of the corresponding belief level representations as follows:

$$S(Q, D) = \sum_{i=0}^{N} w_i s_i \quad [6]$$

where N is the number of belief levels, $s_1$ is the similarity between the query and the database image for the $i^{th}$ belief level, and $w_1$ is the weight to be assigned to the $i^{th}$ belief level. The weight to be attached to each individual belief level is dependent on the desired type of retrieval. In the preferred embodiment, there are six different options for image retrieval according to a main subject belief map:

(1) Image retrieval based on the similarity values from all belief levels of the image, with most emphasis on the most definite main subject belief levels, and least emphasis on the most definite background belief levels. In this case, a typical distribution of $w_i$ is shown in FIG. 8a, with monotonically decreasing values from main subject levels down to background levels.

(2) Image retrieval based on the similarity values from only the belief levels associated with the main subject regions of the image. In this case, a typical distribution of $w_i$ is shown in FIG. 8b, with monotonically decreasing values of $w_i$ in the main subject belief levels, but zero values of $w_i$ in the background belief levels.

(3) Image retrieval based on the similarity values from only the belief levels associated with the background regions of the image. In this case, a typical distribution of $w_i$ is shown in FIG. 8c, with monotonically increasing values of $w_i$ in the background belief levels, but zero values of $w_i$ in the main subject belief levels.

(4) Image retrieval based on a differential combination of similarity values derived from the main subject belief levels and background belief levels, with positive emphasis on similarity in main subject belief levels and negative emphasis on similarity in background belief levels. In this case, a typical distribution of $w_i$ is shown in FIG. 8d, with positive monotonically decreasing values of $w_i$ in the main subject belief levels, and negative monotonically decreasing values of $w_i$ in the background belief levels.

(5) Image retrieval based on a differential combination of similarity values derived from the main subject belief levels and background belief levels, with negative emphasis on similarity in main subject belief levels and positive emphasis on similarity in background belief levels. In this case, a typical distribution of $w_i$ is shown in FIG. 8e, with negative monotonically increasing values of $w_i$ in the main subject belief levels, and positive monotonically increasing values of $w_i$ in the background belief levels.

(6) Image retrieval based on a differential combination of similarity values derived from the main subject belief levels and background belief levels, with random or any desirable emphasis on various main subject belief levels and background belief levels. In this case, any distribution of $w_i$ is valid. FIG. 8f shows an example of a possible distribution of $w_i$.

Note that in FIGS. 8a–f, the x-axis of the graph represent the existing N belief levels, with the left most level representing the most definitely main subject regions, monotonically decreasing belief of main subject in between, and the right most level representing the most definitely background regions. The coloring scheme used in the figure is green for main subject belief levels (in decreasing main subject belief from left to right), and red for background belief levels (with increasing background belief from left to right).

Still further, the overall image similarity between a query image and a database image can be calculated as the weighted sum of the similarity of each of the corresponding belief level representations as follows:

$$S(Q, D) = \sum_{j=0}^{N} \sum_{i=0}^{N} w_{ij} s_{ij} \qquad [7]$$

where N is the number of belief levels, $s_{ij}$ is the similarity between the $i^{th}$ belief level of the query image and the $j^{th}$ belief level of a database image, and $w_{ij}$ is the weight to be assigned to the similarity. The weight to be attached to each pair of individual belief levels is dependent on the desired type of retrieval, and the desired amount of "sloppiness" allowed when matching among neighboring belief levels.

An example set of weights $\{w_{ij}\}$ is given in a matrix format as $$W = \begin{bmatrix} 0.5 & 0.2 & 0 \\ 0.2 & 0.3 & 0.1 \\ 0 & 0.1 & 0.2 \end{bmatrix} \qquad [8]$$

where the diagonal weights function the same way as those in Equation (6), and the off-diagonal weights allow "soft" matching among neighboring belief levels to account for potential inaccuracy in belief level partitioning that could be introduced by the main subject detection process.

After calculating the similarity metric for all the database images, they can be rank ordered and displayed according to their similarity to the query image. Those skilled in art would recognize that other similarity measures could be employed within the scope of this work. The thumbnails of the selected images can be optionally retrieved and displayed in ranked order.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

Thus, the present invention has been described herein with reference to a particular embodiment for a particular application. Those having ordinary skill in the art and access to the present teachings will recognize additional modifications applications and embodiments within the scope thereof. For example, one straightforward extension is to design a method for providing a belief map indicating the non-main subject portion of the scene, and still be able to infer the main subject and use the inferred information for determining image similarity within the scope of the present invention.

It is therefore intended by the appended claims to cover any and all such applications, modifications and embodiments within the scope of the present invention.

Accordingly,
What is claimed is:

1. A method for determining image similarity, comprising the steps of:
   providing a first image having an associated set of perceptually significant features, said features each corresponding to individual ones of a set of belief levels, said belief levels being step-valued as to likelihood of main subject;
   automatically generating a belief level image from a second image, at each of said step-valued belief levels, to provide a plurality of belief level images;
   automatically extracting one or more perceptually significant features from each of said belief level images to provide extracted features; and
   comparing, at each of the corresponding said belief levels, said extracted features to corresponding said features of said sets of perceptually significant features.

2. The method of claim 1 wherein said generating further comprises the steps of:
   creating a continuously valued belief map of said second image, wherein said map has belief values that vary with likelihood of main subject;
   deriving a multiple valued belief map from said continuously valued belief map, said multiple valued belief map having belief levels corresponding to said set of step-valued belief levels;

masking said second image with said multiple valued belief map to provide said belief level images.

3. The method of claim 2 wherein said creating further comprises:
   segmenting the second image into a plurality of regions of homogenous color and texture;
   computing at least one structure feature and/or one semantic feature for each of said regions; and
   computing a belief value for all the pixels in each of said regions using a Bayes net to combine the features.

4. A method for determining image similarity, comprising the steps of:
   providing a plurality of database images, each of said database images having an associated set of perceptually significant features, said features each corresponding to individual ones of a set of belief levels, said belief levels being step-valued as to likelihood of main subject;
   automatically generating a belief level image from a query image, at each of said step-valued belief levels, to provide a plurality of belief level images;
   automatically extracting one or more perceptually significant features from each of said belief level images to provide extracted features; and
   comparing, at each of the corresponding said belief levels, said extracted features to corresponding said features of said sets of perceptually significant features.

5. The method of claim 4 wherein said generating further comprises the steps of:
   creating a continuously valued belief map of said query image, wherein said map has belief values that vary with likelihood of main subject;
   deriving a multiple valued belief map from said continuously valued belief map, said multiple valued belief map having belief levels corresponding to said set of step-valued belief levels;
   masking said query image with said multiple valued belief map to provide said belief level images.

6. The method of claim 5 wherein said creating further comprises:
   segmenting the query image into a plurality of regions of homogenous color and texture;
   computing at least one structure feature and/or one semantic feature for each of said regions; and
   computing a belief value for all the pixels in each of said regions using a Bayes net to combine the features.

7. The method of claim 4 further comprising the step of retrieving one of said database images based upon similarity of said extracted features to features of the set of perceptually significant features associated with said one of said database images.

8. The method of claim 4 further comprising, during said comparing, emphasizing some of said belief level images relative to others of said belief level images.

9. The method of claim 8 wherein said belief level images having a highest likelihood of main subject are emphasized and said belief level images having lowest likelihood of main subject are deemphasized.

10. The method of claim 9 further comprising providing different options of relative emphasis of said belief level images during said comparing.

11. The method of claim 10 wherein said options include:
    (a) positive emphasis on said belief level images, with most emphasis on belief level images having a highest likelihood of main subject and least emphasis on belief level images having a lowest likelihood of main subject;
    (b) only emphasis on belief level images having a highest likelihood of main subject;
    (c) only emphasis on belief level images having a lowest likelihood of main subject; and
    (d) differential emphasis on belief level images, with some of said belief level images positively emphasized and others of said belief level images negatively emphasized.

12. The method of claim 4 wherein said perceptually significant features of said database images are weighted sums and said extracting further comprises calculating weighted sums from each of said belief level images.

13. The method of claim 4 wherein said comparing further comprises calculating:

$$S(Q, D) = \sum_{j=0}^{N} \sum_{i=0}^{N} w_{ij} s_{ij}$$

where S(Q,D) is the similarity of features of said belief level images of said query image, Q, and one of said database images D, at corresponding said belief levels; N is the number of belief levels, $s_{ij}$ is the similarity between the ith belief level image of the query image and the jth belief level of the database image, and $w_{ij}$ is a predetermined weight.

14. The method of claim 13 wherein $$w_{ij} = \begin{bmatrix} 0.5 & 0.2 & 0 \\ 0.2 & 0.3 & 0.1 \\ 0 & 0.1 & 0.2 \end{bmatrix}.$$

15. The method of claim 4 wherein said perceptually significant features include at least one of color, texture, and shape.

16. The method of claim 4 wherein said sets of perceptually significant features are stored in a database, organized by index structures and said comparing further comprises searching said index structures.

17. The method of claim 4 wherein the retrieved image has a similar main subject.

18. The method of claim 4 wherein the retrieved image has a similar background.

19. The method of claim 4 wherein the retrieved image has a similar main subject, but different background.

20. The method of claim 4 wherein the retrieved image has a different main subject, but similar background.

21. The method of claim 4 wherein the retrieved image has a similar main subject, and similar background.

22. A method for determining image similarity, comprising the steps of:
    providing a plurality of input images, each of said input images having an associated set of perceptually significant features, said features each corresponding to individual ones of a set of belief levels, said belief levels being step-valued as to likelihood of main subject;
    automatically creating a continuously valued belief map of a query image, wherein said map has belief values that vary with likelihood of main subject;
    deriving a multiple valued belief map from said continuously valued belief map, said multiple valued belief map having belief levels corresponding to said set of step-valued belief levels;

masking said query image with said multiple valued belief map to provide a belief level image at each of said step-valued belief levels;

automatically extracting one or more perceptually significant features from each said belief level image to provide extracted features; and comparing, at each of the corresponding said belief levels, said extracted features to corresponding said features of said sets of perceptually significant features.

23. The method of claim 22 wherein said creating further comprises:

segmenting the image into a plurality of regions of homogenous color and texture;

computing at least one structure feature and/or one semantic feature for each of said regions; and computing a belief value for all the pixels in each of said regions using a Bayes net to combine the features.

24. The method of claim 23 further comprising the step of retrieving one of said input images based upon similarity of said extracted features to features of the set of perceptually significant features associated with said one of said input images.

25. The method of claim 24 wherein said perceptually significant features include at least one of color, texture, and shape.

26. The method of claim 25 wherein said sets of perceptually significant features are stored in a database, organized by index structures and said comparing further comprises searching said index structures.

27. The method of claim 26 wherein said perceptually significant features of said input images are weighted sums and said extracting further comprises calculating weighted sums from each of said belief level images.

* * * * *